No. 855,066. PATENTED MAY 28, 1907.
B. McINNERNEY.
MEANS OF CONTROL FOR AN ELECTRICALLY ACTUATED BODY.
APPLICATION FILED APR. 9, 1906.
2 SHEETS—SHEET 1.
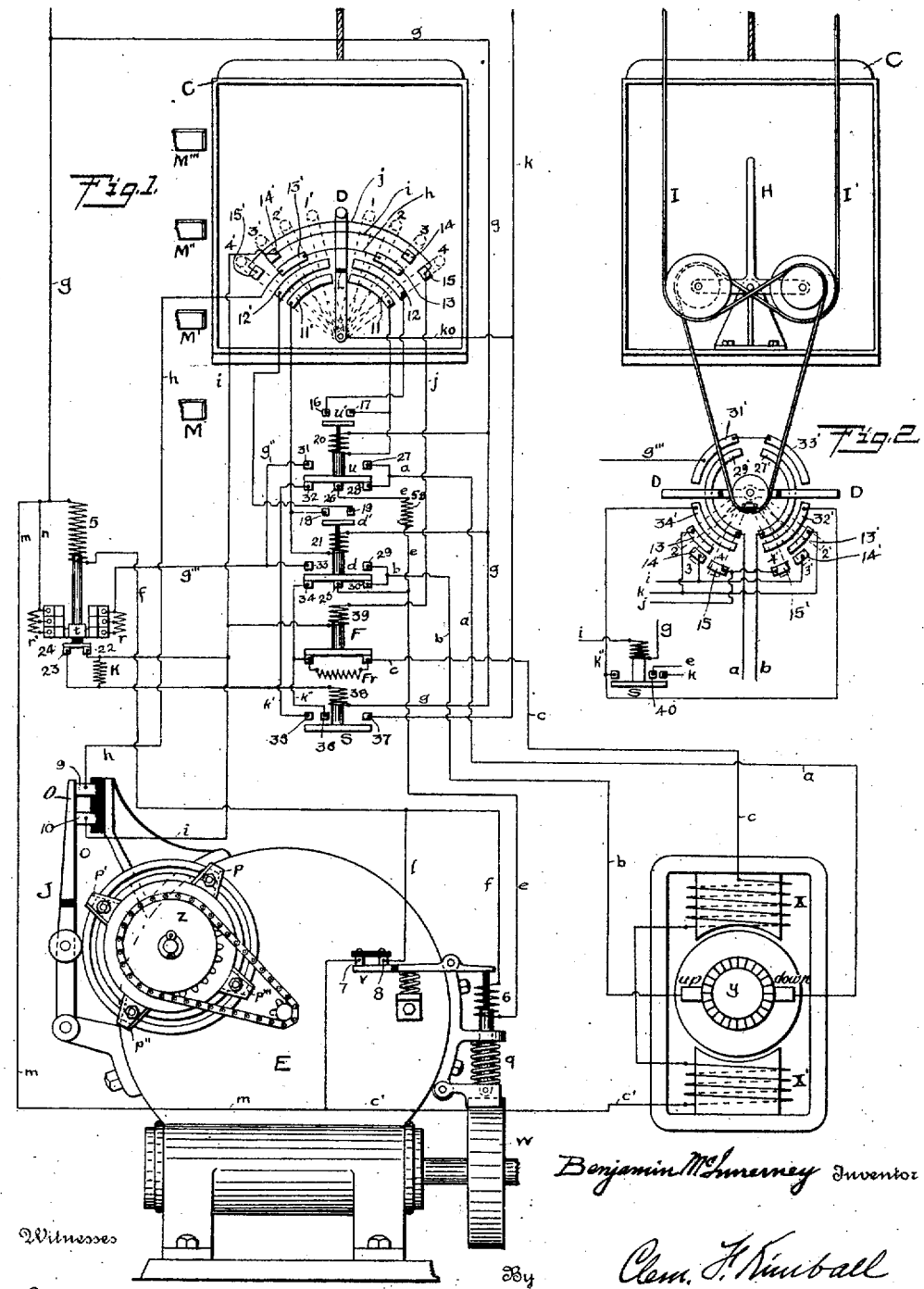
Witnesses
Carroll W. Kimball
Curtis C. Clifton
Benjamin McInnerney Inventor
By Clem. F. Kimball
Attorney

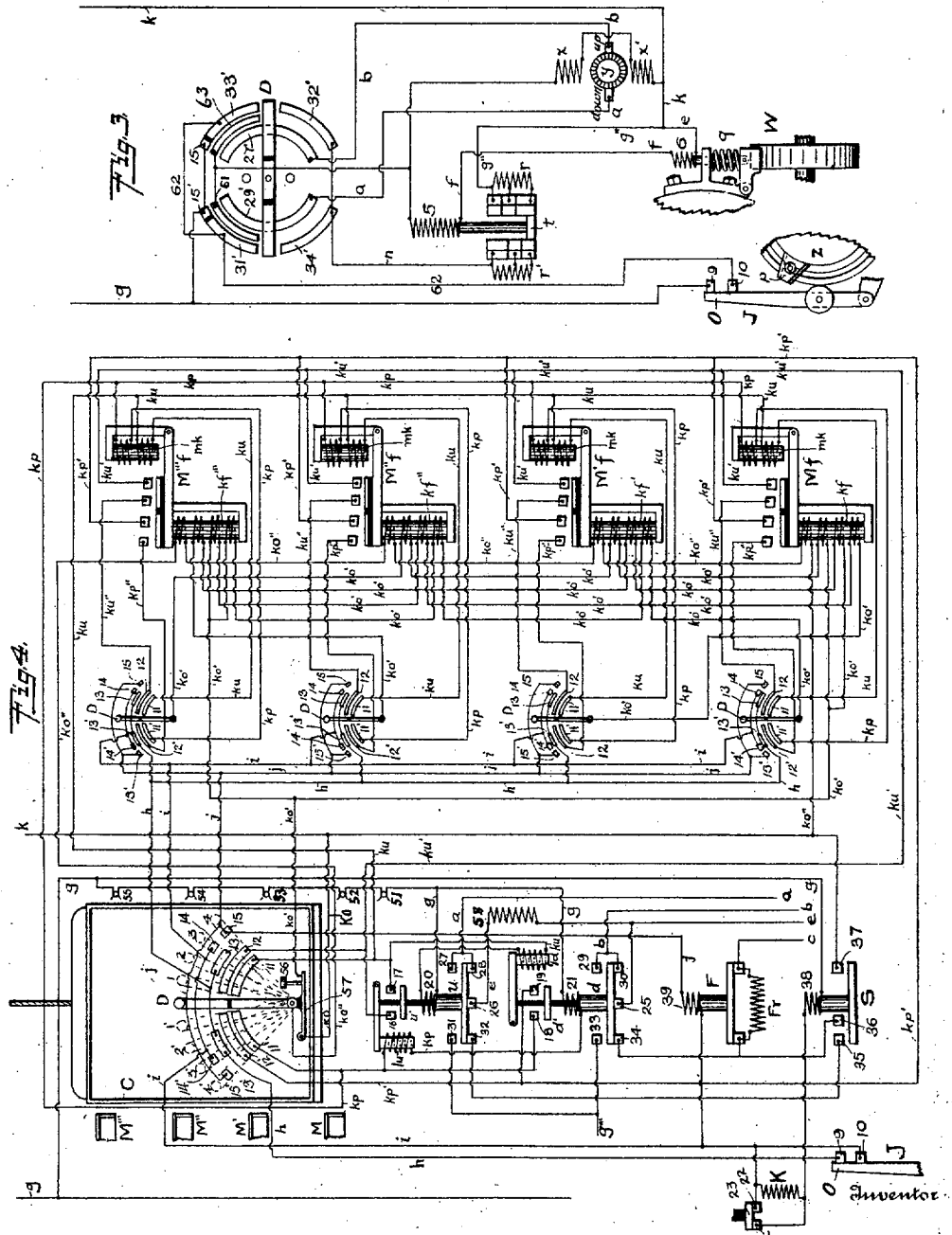

UNITED STATES PATENT OFFICE.

BENJAMIN McINNERNEY, OF OMAHA, NEBRASKA.

MEANS OF CONTROL FOR AN ELECTRICALLY-ACTUATED BODY.

No. 855,066.   Specification of Letters Patent.   Patented May 28, 1907.

Application filed April 9, 1906. Serial No. 310,750.

*To all whom it may concern:*

Be it known that I, BENJAMIN McINNERNEY, of Omaha, Douglas county, Nebraska, have invented a new and useful Improvement in Means of Control for an Electrically-Actuated Body, of which the following is a specification.

My invention relates to a means of control for an electrically moved car or body.
The object of my invention is to provide a means whereby an operator can direct the movement of an electrically actuated body from the body or from any suitable place. For further object that said operator can regulate and vary the speed of the said actuated body. And for further object to direct the movement of the said body and simplifying the means when so moved for automatically stopping at any one of any number of stations. And for further object of so directing the movement of an electrically actuated body and reducing the speed and automatically stopping at selected stations after said speed is reduced. And for further object of providing a means for directing a movement of said electrically operated body away from such selected station where said body may have been automatically stopped and at a reduced rate of speed. And for the further object to provide in connection with such direction, control and automatic stoppage, means to insure safety and positive electrical action.

Other detailed objects of my invention will appear more fully in the description of the same.

My invention consists of a combination and arrangement of switches, circuits and devices which are hereinafter more fully described in this specification and the diagrams and drawings.

Figure 1. is a side elevation of gearing intermediate between the power applied and the moving body with switches, diagram of circuits and resistances. Fig. 2 is a side elevation of said electrically actuated body and a diagram of mechanically operated switch and circuits. Fig. 3 is a diagram showing a mechanically operated switch and circuits.
Fig. 4 is a diagram showing operating switch in Fig. 1 in plurality and applied to landings or stations with diagram of non-interference switches.

In the drawings and the diagrams my invention is represented as applied to an elevator car, with the customary intermediate worm and gearing in the casing E, and actuated by a motor whose armature is represented in the diagram at $y$. My invention however is not confined to the control of elevator machinery, but may apply to any car or body driven by electrical power and my invention is here shown applied to elevator machinery for convenience of illustration and not for limitation.

Similar letters and figures indicate like parts through the drawings and diagrams.

D represents the bar of an operating switch arranged to be moved at the will of an operator, either upon the car as illustrated in Fig. 1, or by any suitable means at a distance from the actuated body as shown in Fig. 2, or upon landings, or at stations remote from the car as shown in Fig. 4; $k$ and $g$ are the respective line wires furnishing current for the operation of the machine. The lever D is connected to the line $k$ by the line $ko$ with (Fig. 1) or makes with the contact piece 34' or 32' (Fig. 2) said contact pieces 34' and 32' connecting with the said line $k$ through line $k''$ and switch $s$. The contact piece 11 is connected to the solenoid 20 of a reversing switch $u$ and the contact piece 11' is connected with the solenoid 21 of a reversing switch $d$. The contact pieces 13, 13' are connected through the line $h$ to the contact pieces 9 of a station switch J and the contact pieces 14 and 14' are connected through the line $i$ to the contact piece 10 of a station switch J and the line $i$ connects with the solenoid 38 of a line switch $s$. The contact pieces 15 and 15' are connected through the line $j$ with the solenoid 39 of a field switch F to the line $i$. The reversing switches $u$ and $d$ may have the usual mechanical or electrical means of interlocking well known to the art, but where a single operating switch is used as in Fig. 1, I consider this unnecessary for reasons hereinafter shown.

To insure safety of operation and to guard against dangerous or false movements of the driven body by reason of derangement of reversing switches $u$ and $d$, the switch bar D may be divided with one part insulated from the other by insulation at L and the contact pieces 12 and 12' added. The contact piece 12 is then connected to the contact piece 16 and the contact pieces 12' to a contact piece 19. Upon the reversing switch $u$, and insulated from it is a bar $u'$ arranged to connect the contact piece 17 with a contact piece 16. Upon the reversing switch $d$ and insulated from it is the switch bar $d'$ arranged to connect the contact piece 19 and 18. The contact piece 17 is connected to the contact piece 11 and the contact piece 18 to the contact 11'. When the contact pieces 12 and 12' (Fig. 1) are not used there is no insulation L in the lever D of the operating switch and said lever D is arranged to be moved, and connect when in the position 2, the contact piece 11 and 13'; when moved to the position 3 to connect the contact pieces 11, 13 and 14; and when moved to the position 4 to connect the contact pieces 11 and 15. And likewise when the said lever D without the insulation L is moved to the position of 2' it connects the contact pieces 11' and 13'; and when moved to the position 3' connects the contact pieces 11', 13' and 14'; and when moved to the position 4' said lever connects contact pieces 11' with 15'. When the contact pieces 12 and 12' (Fig. 1) are used and connected as aforesaid the portion of the lever D making contact with the pieces 12, 13, 14, 15 respectively is insulated from that portion of said lever D making contact with the pieces 11 and 11' respectively by the insulation L. The line switch $s$ is placed in the line $k$ and connected through the line $k'$ with the reversing switch $u$ and through the line $k''$ with the reversing switch $d$. In the line $i$ to the solenoid 38 of said line switch $s$ is placed a switch 24 attached to the starting switch $t$ hereinafter described, which switch 24 has the contact pieces 23 and 22 in the same line $i$.

The reversing switch $u$ connects with contact pieces 32 and 28 when down and 31 and 27 when up, and the reversing switch $d$ connects the contact pieces 34 and 30 when down and the contact pieces 33 and 29 when up. The contact pieces 29 and 30 through the line $b$, are connected with one terminal of the armature designated up, and the contact pieces 27 and 28 of the reversing switch $u$ connects through the line $a$ with the terminal designated down of said motor. The contact piece 33 connects with the starting resistance $r$ and $r'$ through the line $g'''$ and the contact pieces 31 of the reversing switch $u$ connects through the line $g''$ to the said starting resistance $r$, $r'$, part or all of which may be wound upon the motor field core in the usual manner and the said resistance $r'$ is connected through the line $n$ to the line $g$. The contact pieces 26 of the reversing switch $u$ is connected by said reversing switch to the contact piece 32 when down and the contact piece 25 of the reversing switch $d$ connecting, when said switch is down, with the contact piece 34. Said contact piece 26 and 25 are connected through the line $e$ with the solenoid 6, and said solenoid 6 to the line $f$. The line $f$ is connected to the solenoid 5 of the starting switch $t$ and the solenoid 5 is connected to the line $g$. In the circuit through the field $x$ and $x'$ of said motor and connected by the line $c$, is placed the field switch F, having the solenoid 39 and the field resistance Fr, said solenoid 39 is in the line $j$. Said field resistance Fr is short circuited when the field switch is closed and said field resistance Fr is thrown in series with said field $x$ and $x'$ when the field switch F is opened. Upon any convenient moving element of said mechanism is placed the brake wheel $w$, upon which the brake applied by spring $q$ is arranged to act and which is released by a solenoid 6. The line $f$ through the solenoid 5 is short circuited through the line $l$ and the line $m$ to the line $g$ when the contact pieces 7 and 8 are connected by the switch $v$. The switch $v$ is arranged to break the contact between the pieces 7 and 8 when the brake $q$ is released. Upon any convenient moving part of the intermediate mechanism or attached to it as $z$ are placed movable adjustable pieces $p, p', p'', p'''$, said pieces corresponding in number to the stopping places or stations desired and corresponding to the station M, M', and M''' for the electrically actuated body $c$. The switch bar $o$, of the switch J is arranged to connect the contact pieces 9 and 10 except when by irregularity of $z$, which may be accomplished in any suitable manner but preferably by projection, of the pieces $p, p', p'', p'''$ etc., the bar $o$ of the said station switch J is moved to open the said switch.

When the operating switch D is operated by mechanical means at a distance from the moving body C, or where the mechanically operated reversing switch is used, the respective terminals 27' and 29' of the motor circuit through the lines $a$ and $b$ are arranged to connect respectively with the contact pieces 31' and 32', and the contact pieces 33' and 34'. The contact pieces 31' and 33' are connected to the line $g'''$ and the contact pieces 34' and 32' are connected with the line $k''$. When the bar D (Fig. 2) is in the position 3 the contact pieces 29' and 34', 13 and 14 are connected, and when the said lever D is in the position 4, the contact pieces 29', 34' and 15 are connected and in a corresponding manner when the lever D is in the position 2', the contact pieces 27', 32' and 13 are connected and when said lever D is in position 3' the contact pieces 27', 32', 13' and 14' are connected; and when the lever D is in the position 4', contact pieces 27', 32' and 15' are connected. A mechanically operated switch D, as shown in Fig. 2, may either be placed upon the moving body c or at a distance from it with suitable means for operating it. The electrical switches described herein may be replaced by a mechanical switch as shown in Fig. 3. When such mechanical switch is employed in place of electrical controlled switches a line $k$ connects with the field $x'$ and $x$, (Fig. 3). The field coils $x$, $x'$ are connected with the contact pieces 61 and 63 of the switch D. The line $k$ through the line $e$ may connect with the solenoid 6 of the brake $q$ and through the line $f$ to the solenoid 5 of the starting switch $t$ (Fig. 3), which said solenoid 5 is connected to said contact 61 and 63. The line $k$ is connected through the line $g''$ (Fig. 3), through the resistances $r$ and $r'$ part or all of which may consist of series field coils, and the line $n$ to the contact pieces 34' and 32'. The contact pieces 31' and 33' (Fig. 3) is connected through the line 62 to the contact piece 10 of the station switch J (Fig. 3) which connects the contact pieces 9 and 10, which contact piece 9 is connected with the line $g$ (Fig. 3). The contact pieces 15 and 15' (Fig. 3) is connected to the line $g$.

The operating switch D may be used singly or in plurality as shown in Fig. 4 with a switch D placed at each landing or station M, M', etc. When the operating switch D is multiplied the line $ko$ may be connected to a switch 57 and an emergency stop button 56 may be supplied upon the car C, which said switch 57 when used is by the line $ko'$ connected to the lever D of the respective station or landing switches. The line $ko'$ (Fig. 4) is divided into as many circuits as there are station switches and to prevent interference for operation of any switch each branch of the line $ko'$ is connected to a solenoid on the cores $kf$, $kf'$, $kf''$, $kf'''$, of the non-interference switches $Mf$, $M'f$, $M''f$, $M'''f$, of which there is one of such non-interference switches for each switch D besides the car switch D. The divided line $ko'$ to each operating switch D for landing or station is connected to solenoids upon the cores $kf$, $kf'$, corresponding to the landing or station of the operating switch D so connected. The operating switches D when used in plurality and at stations have the contact pieces 11 connected to the line $ku$, and has inserted in each branch thereof, a solenoid upon the core $Mk$. The line $ku$ is connected to the contact piece 17 and may be connected to a solenoid $ld$ of the reversing switch $d$ and then connected to the solenoid 20 of the reversing switch $u$. In a similar manner the contact pieces 11' of the operating switches D, when in plurality are connected to the line $kp$, each branch of which is connected through a solenoid upon the core $Mk$, the line $kp$ being connected to the contact pieces 18 of the reversing switch $d$. The line $kp$ may also connect through the solenoid $lu$ of the reversing switch $u$ and connect with the solenoid 21 of the reversing switch $d$.

When the switch 57 is not used and when the operating switch D is used in plurality, the line $ko''$ may be run from the line $k$ about each of the cores $kf$, $kf'$, $kf''$, $kf'''$ etc., (which said contacts on said switches are connected respectively) and the operating switch D on the body or car C. The contact piece 16 is connected through the line $ku'$ to each of the non-interference switches $Mf$, $M'f$, $M''f$, $M'''f$, etc., which said contacts on said switches are connected respectively to the contacts on the lines $ku''$, which lines $ku''$ are connected with the contact pieces 12 of the operating switches D. The contact piece 19 is connected through the line $kp'$ to the contact pieces of each of the non-interference switches $Mf$, $M'f$, $M''f$, $M'''f$, etc., which said contacts are by said switches connected to the lines $kp''$, which lines $kp''$ are connected to the contact pieces 12', of the operating switches D. The line $ku'$ is also connected directly with the contact piece 12 and the line $kp'$ is connected with the contact piece 12' of the operating switch D upon the car or body C without passing through the contacts on the station switches $Mf$, $Mf'$, etc. The remaining contacts of the operating switches D, when used in plurality are the same as already described, when used singly. When the mechanical switch, as shown in Fig. 3 is used in plurality as may be done or when switch 57 is used, the line $ko''$ and its branches about the cores $kf$, $kf'$ etc. is omitted. The solenoids 20 and 21 of the reversing switches $u$ and $d$ respectively are connected to the line $g$ in which may be placed the usual slack cable switches 51 and door switches 52, 53, 54, 51, etc. The non-interference switches $Mf$, $M'f$, etc. are arranged so that the cores $kf$, $kf'$, etc. have an energy over the cores $Mk$ by any suitable means preferable and lever is shown. In the circuit from the line $i$ to the solenoid 38 may be placed a resistance K to pass a current sufficient to hold line switch $s$ closed but insufficient to close it when open. The pieces $p$, $p'$, $p''$, $p'''$, etc. are arranged to be placed in adjustable positions upon the moving part $z$ of the intermediate mechanism and may also be arranged for an adjustment of their faces to vary the length of time the switch bar $o$ is out of contact with the contact pieces 9 and 10 by reason of the travel of the moving member $z$.

In the control of an electrically actuated body and especially of elevator cars, it is desirable to have a simple and efficient means of control or direction of movement of the body or car, such that an inexperienced person can control such movement accurately and without especial skill, by having the simple knowledge of the results following various positions of an operating lever or handle. It is found exceedingly beneficial to the machinery to be able to reduce the speed of such car or body in starting and stopping, or approaching a stopping place. It is also well known to those skilled in the art that to make exact stops, or to stop exactly at the proper position before a station, requires great skill and experience in turning off current or applying brakes in the ordinary manner, and demands skill and experience of the operator in choosing the right moment in approaching a station, with facility of action at the right moment and all involving an exercise of judgment as to speed and time. To start the car in a chosen direction, and then to be able, between such direction of movement and any after selected station within varying reasonable distances therefrom, to automatically stop at such selected stations at exactly the right position without skill of the operator will save wear on machinery and annoyance and delay incident to reversing and extra starts to make proper landing and accomplish highly desirable and useful results. This combined with ability to reduce speed preparatory to making such automatic stop and to provide for any number of stops in either direction with one station switch is of great benefit in simplifying and rendering such mechanism less liable to derangement. With such ability of control by the operator it is necessary to be able to move the car at its highest speed in either direction between the limits of travel. By the combination of switches, circuits and mechanical devices herein described, I am by my invention able to accomplish these novel and desirable objects.

The direction of the movement of the operating switch D by the operator indicates the direction of the movement of the car or body C. Thus in the diagram, for convenience of illustration, it will require movement of the lever D to the right to move the car or body C upward and to the left to move it in the opposite direction. To illustrate the operation of this device, as shown in Fig. 1, if the operator desires to move the car or body toward the station M'' and M''' the lever D of the operating switch will be moved to the right. As contact is made by said lever with the contact pieces 11 and 12 in position 1, the reversing switch $u$ is operated and contact between the pieces 32, 26 and 28 is broken and made between the contact pieces 31 and 27. When said lever D is moved to the position 2, if the contact piece 12 is used and insulation L divides the lever D, a circuit is formed through the contact pieces 17 and 16 to the contact pieces 13 to the line $h$, and if the station switch J be closed, connecting the contact pieces 9 and 10 the solenoid 38 of the line switch $s$, will be energized, closing the said line switch $s$ and connecting the contact pieces 37 and 36, and circuit will then be established from the line $k$ through the reversing switch $d$ to the line $b$ and the current will enter the armature at the terminal up moving the car or body C in the direction designated as up. As the said body C moves upward and approaches the station or landing M'', when the moving member $z$, carrying the piece $p''$, travels in proportion to movement of said body or car C until it reaches the landing M'', when the piece $p''$ will operate the lever $o$ of the station switch J and the circuit through the solenoid 38 of the line switch $s$ will be broken opening the same and the current in the armature $y$ will cease and the car or body C will be stopped definitely at the station M''. By moving the lever to the position 3 contact is formed between the contact pieces 12 and the contact piece 14 and a current established in the line $i$, but not in the line $h$, the point $p''$ holding the station switch J open. The current in the line $i$ through the solenoid 38 to the line $g$ will again close the line switch $s$ and the body C will move upward. As the body C moves away from the station M'' at the proper time and place in its travel, the station switch J is closed until the body C reaches the station M''' when the station switch J is again opened. Should the operator desire to stop at the station M''' at a convenient distance therefrom not necessarily exact he will move the lever D to the position 2 and the circuit through the line switch $s$ will be broken as heretofore described by the station switch J and the said car or body C will stop at the station M'''.

In the circuit $c$, $c'$ of the field coils $x$, $x'$ of the operating motor may be placed a field switch F and field resistance Fr. The said field switch F being operated in convenient manner as by the solenoid 39 in the circuit through the line $j$. When the lever of the operating switch D is brought to the position 4 or 4' a current will be established in the line $j$ opening the switch F and removing the short circuit of the field resistance Fr, thereby decreasing the current in the field coils $x$ and $x'$ and increasing the speed of said motor. But when the lever of the operating switch D is brought to either of the positions 2, 3, 2' or 3' operating the line switch $s$, the field coils $x$, $x'$ will be strengthened by short circuiting the field resistance Fr by the switch F, reducing the speed of the motor. Thus when the lever D is brought to the position 2 the car will be moved upward at a slow speed until stopped by the station switch J as described, and when brought to the position 3 the car C will move upward at a reduced speed, without reference to the station switch J. If after the last operation described the lever of the switch D be brought to the position 4 the car or body C will be given its highest speed until it reaches the next station or landing succeeding said operation of said lever D. The changing of speed of said motor whose armature is $y$ is not limited to strengthening or weakening the field of said motor by said resistance Fr but may be done by any other convenient or well known means as adding circuits to the armature $y$ and by any suitable switch.

For the purposes of safeguarding the reversing switches $u$ and $d$ against failure of operation or mechanical derangement of any kind, the insulation L may divide the lever of the switch D, and by inserting the contact pieces 12 and 12' and the contact pieces 16 and 17 and 18 and 19 respectively. A failure to operate either of the said reversing switches $u$ or $d$ would result in inaction and failure of current in the line switch $s$. By throwing into the armature circuit in the line $a$ to $g'$, the contact pieces 27 and 31 of the reversing switch $u$, and in the line $b$ to $g''$ of said armature circuit the contact pieces 29 and 33 of the reversing switch $d$ the said reversing switches $u$ and $d$ are electrically interlocked in said armature circuit $a$—$b$. In this manner any failure of said reversing switches to act or any mechanical derangement thereof will result in inaction, unless one reversing switch is properly operated. In case both reversing switches $u$ and $d$ are thrown up or left up from any cause, the armature circuit will be broken in one or the other of said reversing switches $u$ and $d$ and there will be inaction. In case neither of the said reversing switches $u$ and $d$ are raised, the armature circuit will still be broken and the result will be inaction. And in case said reversing switch $d$ and $u$ should be disposed in an opposite position from that intended to follow the operation of the switch $D$, still there would be inaction by reason of a failure of operating current in the proper direction through the contact pieces 12 and 12' to the line $k$. It will be readily seen that the line switch $s$ may also be similarly interlocked for purpose of safeguard in connection with this invention.

In place of the electrical reversing switches $u$ and $d$ may be substituted the mechanical reversing switch shown in Fig. 2, having the contact piece 29' connected to the line $a$ and the contact piece 27' to the line $b$, and the contact piece 31', 33' to the line $g'''$ and the contact pieces 34' and 32' connected to line $K''$. Either of said switches $D$ may be placed upon the car or body $C$ or may be operated at a distance from it. And said switches may be placed at some convenient distance and operated from the car or body $C$ by any convenient mechanism as the cables $i$, $i'$ and the lever $H$.

In the lines $a$—$b$ from the motor, through the lines $g'$, $g''$ and $g'''$ and connected to the line $g$ by the line $n$ may be placed the usual starting switch having the resistance $r$, $r'$ and operating in any suitable manner or as shown by the solenoid 5 in the line $f$ to $g$. In the line $e$ to $f$ may also be placed the brake solenoid 6, arranged to release the brake $q$ upon the brake wheel $w$. The solenoid 6 acting upon the brake $q$ may be arranged to operate the lever $v$ breaking the contact between the points 7 and 8 slightly in advance of the release of the brake $q$ and of the action of the starting switch $t$. Thus when the line switch $s$ is closed and a current established through the motor circuit $a$—$b$ a current is established through either of the contact pieces 25 or 26 (Fig. 1) in the line $e$, through the brake solenoid 6 and the line $f$, and through the line $i$ and the switch $v$ and the line $m$ to the line $g$, until by the movement of the brake $q$ the switch $v$ is opened, when the short circuit of the solenoid 5 in the line $f$ is broken, and the starting switch $t$ is actuated throwing out the resistances $r$, $r'$. Thus after the operation of releasing the brake is accomplished the resistance in the motor circuit is thrown out increasing the speed of the motor. In case the mechanical reversing switch is used as shown in Fig. 2 in place of the electrical reversing switches $u$ and $d$, the lines from the contact pieces 31' and 33' pass directly to the line $g'''$ and the line $e$ may connect to the contact piece 40. When the electrical reversing switches $u$ and $d$ are used by inserting the contact pieces 25 and 26 the extra safeguard is given to the action of the reversing switches for in case both of said reversing switches are deranged so as to remain up, the brake will still be applied, and in case both of said reversing switches are down and brake releases, armature cannot be rotated by the load at a dangerous speed because of the dynamic braking action through resistance 58 in the line $e$.

From this description it will be readily seen that if for any reason the line switch $s$ be opened, the circuit in the line $e$, solenoid 6, and line $f$ will be broken and the brake $q$ applied upon the wheel, and that such will be the result whenever the station switch $J$ is operated with the operating lever $D$ upon the points 13 and 13' or when the lever $D$ is brought to its middle position or upon the contact pieces 11 and 12, or 11' and 12' only. The same objects may be attained by the use of a mechanical switch and direct current as shown in Fig. 3. When the switch $D$ is operated in either direction as on to the contact pieces 63 and 33', or 61 and 31' a current will be established through the field coils $x$, $x'$ and through contact pieces 10 and 9 of the station switch $J$ to the line $g$. When the switch $D$ is operated it is so arranged as to establish a current from the line $k$ through the line $e$, solenoid 6 the line $f$ and solenoid 5 to contact pieces 61 and 63. Also through the line $g''$ the resistance $r$ and $r'$ of the starting switch $c$ through the line $n$ to the contact 34' and 32'. With the switch $D$ operated to connect the contacts as 63 and 33' the brake $q$ will be released, the starting switch $t$ will cut out the resistance of the coils $r$, $r'$ and a current be established from the contact piece 34' to the contact piece 29' and in the line $a$ to the armature $y$ and to the line $g$ as described, moving the armature in the direction indicated as down. While operating switch $D$ is in the position just described if the lever of the station switch $J$ be actuated by the piece $p$, the current between the contact pieces 9 and 10 will be broken, the current through the motor arrested and the brake $q$ applied and the mechanism will stop as heretofore described. By moving the lever D upon the contact piece 15 (Fig. 3) the current will be reëstablished and the motor run without reference to the operation of the station switch J. In a similar manner, if the bar of the operating switch D be moved to the contact piece 31' and 61' the motor will be started in the direction indicated as up until stopped by the action of the station switch J as described. When the lever of the operating switch D is returned to the position off from either of contact pieces 33' or 32' circuits through the motor will be broken and the brake $q$ applied. It is evident that the same means for slowing the speed of the motor (Fig. 3) may be used as with the other electrically operated means of control. But where the mechanical switch described in Fig. 3 is used, it will not be generally desirable to vary the speed of the motor.

When it is desired to use a plurality of operating switches D as described as a switch for one or more stations or landings it becomes desirable to so arrange said operating switches D that operating the operating switch D upon the car or body C can not be interfered with by the operation of any of the other switches D upon any of the landings or stations and when one of such stations or landings switches has been operated it cannot be interfered with by the operation of any other such landing or station switch D. To accomplish this result a non-interference switch M$f$, M'$f$, M''$f$, etc. is provided for each extra operating switch D besides the one on the car or body C. In these switches M$f$, M'$f$, etc. the cores $kf$, $kf'$ etc. have an energy or leverage over the cores M$k$, etc. In these switches when the core M$k$ is energized and the core $kf$, $kf'$, etc. are not energized, the contacts between the lines $ku'$ and $kp''$ are connected.

From the description heretofore given it will be seen that where the operating switch at the station M, having the non-interference switch M$f$ is operated and the lever of the operating switch D is moved, connecting the contacts 11 and 12, the current is received through the line $ko'$, which branch of the line $ko'$ connects to a solenoid on the cores $kf'$, $kf''$, $kf'''$ but not on the core $kf$ and the non-interference switches M'$f$, M''$f$, M'''$f$, etc. will all be held open by the solenoid in the line $ko$ to the operating switch D of the landing M. The current will pass from the line $ko'$ to the contact piece 11 of the operated switch D of the non-interference switch M$f$, operating the switch M$f$ connecting the line $ku'$ and $ku''$. The current in the line $ku$ will operate the reversing switch $u$, connecting the contacts 16 and 17 in the position and the car C to move upward as heretofore described. If said lever of operating switch D at the station M be then moved to the contact piece 13, current from the contact piece 12 through contact piece 13 to the line $h$ will be established, operating the line switch $s$ as heretofore described, and resulting in the car moving at reduced speed in the direction designated as upward, provided the station switch J is closed. By moving the lever of the said switch D to the contact piece 14 the car C will move without reference to the station switch J and at the highest rate of speed. Similarly if the lever of the operating switch D be moved to the contact pieces 11' and 12' a current will be established in the lines $kp$ about the cores M$k$ of the non-interference switches M$f$, M'$f$, M''$f$, etc. and operating the reversing switch $d$ and the non-interference switch M$f$ corresponding to the station M at which the said lever of operating switch D so manipulated. The line $kp'$ will then be connected to $kp''$ and the contact piece 12' and if the lever is moved to the contact piece 13', the car C will move in the direction indicated as down, similarly as described. It will readily be seen that whenever the non-interference switch M$f$ is operated by the movements of the operating switch D, for that station by reason of the current through the line $ko$, any operation of the other levers, at the other landings, will have no effect, by a breaking of the circuits, between the respective lines $ku'$, $ku''$ and $kp'$ and $kp''$. To insure further safety of control and prevent inaction and interference or action in the wrong direction, the line $ku$ is carried about the solenoid $ld$, which has an energy over the reversing switch $d$ in any suitable manner, preferably as here shown by a lever locking the said reversing switch $d$, while the reversing switch $u$ is operated in a similar manner. In the line $kp$ is the solenoid $lu$, having a leverage over the reversing switch $u$, holding the same down when the reversing switch $d$ is operated. As an additional means and for the purpose of giving the operator upon the car or body C the right of way over the operator at any station, the switch 57 may be arranged to break the circuit between the line $ko$ and $ko'$ whenever the lever of the switch D upon the car C is off from the stopped position. The emergency stop button 56 may also attach for emergency stopping or throwing off other operators at the landings, without operating the lever of the switch D on the car C. To insure further safety and non-interference in the use of this system on landings or stations and by plurality of said switches D, the line $ko''$ from the line $k$ may be carried about the cores $kf$, $kf'$ $kf''$, $kf'''$ etc. of the non-interference switches, to the lever of the operating switch D on the car C, making any and all other switches out of the operating switch D on the car C inoperative when it is in operation. This method of non-interference is accomplished in a simpler manner by the use of a speedily energizing force over an inferior energizing force instead of a large number of contacts which are found in practice to be in danger of becoming deranged, fusing and otherwise interfered with.

What I claim and desire to secure by Letters Patent is:

1. In the operation of an electrically driven body, a station switch adapted to automatically open and close a controlling circuit at predetermined intervals in the travel of the driven body and a manually operated switch arranged to render the operation of said station switch effective or ineffective.

2. In the operation of an electrically driven body, a station switch adapted to automatically open and close a controlling circuit at predetermined intervals in the travel of the driven body and a plurality of manually operated switches arranged to render operation of said station switch effective or ineffective.

3. In the operation of an electrically driven body, a station switch adapted to open and close a controlling circuit at predetermined intervals in the travel of a driven body and a manually operated switch adapted to control the movements of said driven body and provided with means which enable operator to render the operation of said station switch effective or ineffective.

4. In the operation of an electrically driven body, a station switch adapted to open and close a controlling circuit at predetermined intervals in the travel of the driven body and a manually operated switch adapted to control the movement of said driven body and means for closing said controlling circuit around said station switch.

5. In the operation of an electrically driven body, an operating switch adapted to be operated manually to reduce speed of driven mechanism and provided with means for automatically making effective the operation of a station switch.

6. In the system of control for an electrically driven body, a plurality of operating switches, each adapted to be operated manually to reduce speed of driven mechanism and provided with means for automatically making effective a station switch.

7. In the operation of an electrically driven body, a station switch adapted to open and close a controlling circuit at predetermined intervals in the travel of the driven body, a manually operated switch adapted to control the movement of said driven body and provided with means which enable the operator to render the operation of said station switch effective or ineffective and an electrically actuated reversing switch, a line switch with means for preventing the operation of the line switch when the reversing switch is improperly disposed.

8. In the operation of an electrically driven body, a station switch adapted to open and close a controlling circuit at predetermined intervals in the travel of the driven body, a manually operated switch adapted to control the movement of said driven body and provided with means which enable operator to render the operation of said station switch effective or ineffective, and a reversing switch with brake connections with means to prevent the release of brake while reversing switch is improperly disposed.

9. In the operation of an electrically driven body, a station switch, a manually operated switch with means for rendering the operation of said station switch effective or ineffective, a reversing switch, a line switch, brake connections with means for preventing the operation of said line switch or release of brake when reversing switch is improperly disposed.

10. In a system of control for an electrically actuated body, a plurality of manually operated switches any one of which is adapted to control the movement of such driven body and a station switch the operation of which is rendered effective or ineffective by any one of said manually operated switches.

11. In a system of control for an electrically actuated body, a plurality of operating switches, a station switch, means for rendering the operation of said station switch effective or ineffective and means for rendering all of said manually operated switches ineffective, except the first of said switches operated.

12. In a system of control for an electrically actuated body, a plurality of operating switches with means for rendering all but one when operated ineffective, and means for rendering all but said one and the first operated of remaining switches ineffective and an automatic station switch the operation of which is rendered effective or ineffective by said operating switches.

13. In a system of control for an electrically actuated body, a plurality of operating switches, non-interference switches, reversing switches and a station switch with means for rendering the operation of such station switch effective or ineffective by manipulation of any one of said operating switches.

14. In a system of control for an electrically actuated body, a mechanically operated station switch in a single controlling circuit and a manually operated switch adapted to render said controlling circuit effective or ineffective.

15. In a system of control for an electrically actuated body, a mechanically operated station switch in a single controlling circuit and a plurality of manually operated switches each one of which is adapted to render said controlling circuit effective or ineffective.

16. In a system of control for an electrically actuated body, a mechanically operated station switch in a single controlling circuit and a plurality of manually operated switches, each one of which is adapted to render said controlling circuit effective or ineffective and means to render all other operating switches ineffective when one is first operated and all ineffective when more than one is operated at the same time.

17. In a system of control for an electrically actuated body, an automatic station switch in a single controlling circuit and a manually operated switch arranged to render the operation of said station switch effective or ineffective and arranged to change the speed of the driving mechanism when the operation of said station switch is made effective.

18. In a system of control for an electrically actuated body, an automatic station switch in a single controlling circuit and a plurality of manually operated switches each of which is arranged to render the operation of said station switch effective or ineffective and arranged to change the speed of the driving mechanism when the operation of said station switch is made effective and non-interference switches arranged to render all other operating switches ineffective when one alone is first operated and all ineffective when more than one is first operated at the same time.

19. In a system of control for an electrically actuated body, an automatic station switch in a single controlling circuit, said station switch adjustable to a varying number and location of stations and a manually operated switch arranged to render the operation of said station switch effective or ineffective.

20. In a system of control for an electrically actuated body, a plurality of operating switches and non-interference switches arranged to give the operating circuit established by any one of said operating switches, power over that established by all other of said operating switches when such one is alone first operated.

21. In a system of control for an electrically actuated body, a plurality of operating switches and non-interference switches arranged to give the operating circuit established by a selected operating switch power over that of all of said remaining operating switches and the operating current established by any one of the said remaining operating switches power over that established by any or all other of said remaining operating switches except said selected operating switch.

22. In a system of control for an electrically actuated body, a plurality of operating switches adapted to control the movement of said driven body and to render effective or ineffective the operation of an automatic station switch in a single controlling circuit with means to render all of said operating switches inoperative if more than one is initially operated at the same time.

23. In a system of control for an electrically actuated body, an operating switch upon the driven body and a plurality of operating switches remote from said body, said operating switches adapted to control the movement of said driven body and render effective or ineffective the operation of an automatic station switch in a single controlling circuit with means to render all of said operating switches remote from said driven body, ineffective when the operating switch upon the said driven body is manipulated, and when more than one of said operating switches remote from said driven body are initially operated at the same time.

24. The combination of a body and a motor to actuate it, of an adjustable automatic station switch having a single set of contacts and an operating switch adapted to control the movement of said body, with means for rendering the operation of said station switch effective or ineffective at the will of the operator for the purposes set forth.

25. The combination of a body and a motor to actuate it, of an adjustable automatic station switch having a single set of contacts and a plurality of operating switches any one of which is adapted to control the movement of said body, with means for any one of said operating switches to render the operation of said station switch effective or ineffective when any one of the said operating switches is alone initially operated for the purposes set forth.

26. The combination of a body and motor to actuate it, of an adjustable automatic station switch having a single set of contacts and an operating switch adapted to control the movement of said body with means for rendering the operation of said station switch effective or ineffective, and means for changing the speed of said motor when said operating switch renders the operation of said station switch effective.

27. The combination of a body and motor to actuate it, of an adjustable automatic station switch having a single set of contacts and an operating switch to control the movement of said body with means for rendering the operation of said station switch effective or ineffective at will of operator, reversing switches and means to render said reversing switches ineffective when improperly disposed.

28. The combination of a body and motor to actuate it, of an adjustable automatic station switch having a single set of contacts and a plurality of operating switches, any one of which is adapted to control the movement of said body and to render the operation of said station switch effective or ineffective, non-interference switches adapted to give any one of said operating switches initially operated, power over all other of said operating switches reversing switches with means to prevent the operation of said reversing switches when improperly disposed.

29. The combination of a body and motor to actuate it, of an adjustable automatic station switch having a single set of contacts and an operating switch adapted to control the movement of said body, with means for rendering the operation of said station switch effective or ineffective and changing the speed of said motor when the operation of said station switch is rendered effective, a reversing switch with means to render the same inoperative when improperly disposed.

BENJAMIN McINNERNEY.

Witnesses:
C. C. CLIFTON,
ETHEL HEISLER.